Patented Mar. 23, 1948

2,438,164

UNITED STATES PATENT OFFICE 2,438,164

PROCESS FOR THE PRODUCTION OF METHACRYLIC ACID

George A. Harrington and Everett Gorin, Dallas, Tex., assignors to Socony-Vacuum Oil Company, Incorporated, a corporation of New York No Drawing. Application March 28, 1946, Serial No. 657,900

13 Claims. (Cl. 260—526)

This invention relates to the preparation of methacrylic acid. More particularly, the invention relates to the catalytic vapor phase hydrolysis of chloretone to methacrylic acid and hydrogen chloride according to the equation

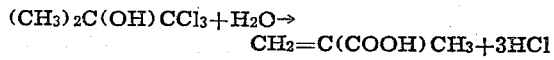

$$(CH_3)_2C(OH)CCl_3 + H_2O \rightarrow CH_2=C(COOH)CH_3 + 3HCl$$

Methacrylic acid is an important intermediate for the synthesis of numerous organic products, particularly transparent resins.

It is an object of this invention to provide a commercially feasible, continuously operable process for the production of methacrylic acid from chloretone. Other and further objects of the invention will become apparent from the following description thereof.

We have found that chloretone may be converted to methacrylic acid in good yield by interaction with steam in the presence of a catalyst comprising a phosphate of a heavy metal of subgroup 1, 2, 3, or 4 of the periodic table of the elements, such as a phosphate of copper, zinc, tin, etc., particularly tin phosphate, or phosphoric acid itself when supported on a suitable carrier.

In accordance with our invention, a mixture of chloretone vapor and steam are passed through a heated reaction zone wherein contact is effected with a suitable catalyst material, such as tin phosphate. The reactor is maintained at a temperature within the range of from about 200° to about 400° C., and preferably between 300° and 350° C. The mol ratio of water to chloretone in the reaction mixture may vary within rather wide limits, the preferred range being from about 10 to about 20 mols of water to 1 mol of chloretone. A molar excess of water is desirable to obtain a more complete conversion with a minimum of side reaction. The reactant mixture is passed over the catalyst at space velocities ranging from 1 to 30 per minute (i. e., 1 to 30 volumes of vaporous reactant charged, reduced to standard conditions of temperature and pressure, per volume of catalyst in the reactor). When the process is carried out at the preferred range, i. e., from 300° to 350° C., space velocities from 4 to 12 min.$^{-1}$ should be employed. The methacrylic acid formed is readily separable from the product stream which comprises methacrylic acid, aqueous hydrogen chloride, and unconverted chloretone. Constant boiling hydrochloric acid may be employed instead of steam to effect the hydrolysis of chloretone if desired. In such a case the hydrogen chloride produced in the process is readily recoverable from the enriched acid effluent as the substantially anhydrous acid by fractionation.

To illustrate the type of results obtainable by the process of our invention and the manner of operation thereof, the following examples are given.

EXAMPLE I

Into a reactor tube, containing 50 ml. of freshly prepared tin phosphate catalyst supported on 8 to 16 mesh pumice, there was steam distilled 23 grams (0.129 mol) of chloretone over a two hour period. The reactor was maintained at 330° C. during the run by means of an electric tube furnace. The products issuing from the reactor were collected, and the following composition was obtained by analysis:

| | |
|---|---|
| Hydrogen chloride | 11.7 grams |
| Chloretone | 3.4 grams |
| Methacrylic acid | 9.9 grams (0.115 mol) |

No acetone was found in the products, indicating that the adverse decomposition of chloretone to acetone, carbon monoxide, and hydrogen chloride did not occur. Based on a chlorine balance, a 96% recovery of products was obtained. An 88% conversion of the chloretone charged to methacrylic acid was obtained.

The tin phosphate catalyst employed in this experiment was prepared as follows: A quantity of pumice (8–12 mesh) was leached with hot aqua regia until it was rendered iron free. Sixty grams of the leached pumice was placed in an evaporating dish and 27 cc. of fuming stannic chloride and 23 cc. of 85% phosphoric acid added thereto and the mixture evaporated to dryness. Distilled water was then added with stirring and the mixture again evaporated to dryness. The catalyst was then treated with steam for about 20 hours at 500° C. until steam condensate gave a negative test for chloride ion.

EXAMPLE II

Into a reactor tube containing 8 to 16 mesh aluminum oxide gel, prepared according to the directions given by Heard in U. S. Patent No. 2,274,634, and heated externally by means of an electric tube furnace to 330° C., there was steam distilled 13.5 grams (0.075 mol) of chloretone over a 2 hour period. The products issuing from the reactor were collected and analyzed. No chloretone was recovered, showing complete consumption of the material. No methacrylic acid or other organic acid was detected. The catalyst was heavily coated with carbon, and considerable gas was formed during the run, indicating that the chloretone was probably destroyed in the manner illustrated by the equation $(CH_3)_2C(OH)CCl_3 + H_2O \rightarrow CH_3COCH_3 + CO + 3HCl$

EXAMPLE III

Into a catalyst tube containing 50 ml. of freshly prepared zinc phosphate catalyst supported on 8 to 16 mesh pumice and heated externally with a tube furnace to 330° C., there was steam distilled 18.2 grams (0.10 mol) of chloretone. The product mixture from the tube was analyzed and found to have the following composition:

Hydrogen chloride _____ 5.46 grams (0.15 mol)
Chloretone _____ 7.10 grams (0.04 mol)
Methacrylic acid _____ 6.88 grams (0.08 mol)

The yield of methacrylic acid in this instance was 80% of theoretical. The catalyst was prepared in the same way as the tin phosphate catalyst of Example I with zinc chloride replacing the stannic chloride.

EXAMPLE IV

Into a catalyst tube containing 50 ml. of a catalyst comprising phosphoric acid supported on kieselguhr and heated externally by a tube furname to 330° C., there was steam distilled 17 grams (0.10 mol) of chloretone. The catalyst was prepared by impregnating kieselguhr with pyrophosphoric acid and calcining at 500° C. for about 10 hours. The products were collected and analyzed. The analysis indicated that only a small amount of chloretone was unconsumed. About thirty per cent of the chloretone fed was converted to methacrylic acid. The remainder was not recovered, possibly being destroyed by the degradative reaction given in Example II.

The foregoing examples indicate the superiority of heavy metal phosphates and phosphoric acid catalysts over other hydration catalysts of the non-phosphoric acid type. Generally similar results are obtained with the other heavy metal phosphates, as copper phosphate and the like. These heavy metal phosphates, particularly tin, zinc, and copper represent the preferred catalysts for, as is apparent from the examples, superior yields are obtained by their use as compared with the phosphoric acid type catalyst.

An important advantageous feature of our invention, particularly from the standpoint of commercial operation, is the ease with which the phosphate catalysts may be regenerated upon deactivation. To illustrate this, the following tables of data are given:

TABLE A

Hourly conversion of chloretone to methacrylic acid

[Fresh tin phosphate catalyst @ 330° C.]

| Data | First Hour | Second Hour | Third Hour | Fourth Hour | Fifth Hour |
|---|---|---|---|---|---|
| Space Velocity (per min.) | 4 | 6 | 5 | 9 | |
| Input (mols chloretone) | 0.025 | 0.057 | 0.032 | 0.051 | 0.115 |
| Output (in mols): | | | | | |
| Hydrogen Chloride | 0.077 | 0.112 | 0.082 | 0.112 | 0.120 |
| Chloretone Recovered | 0.004 | 0.005 | 0.005 | 0.014 | 0.042 |
| Methacrylic acid | 0.050 | 0.044 | 0.031 | 0.045 | 0.068 |
| *Conversion* | | | | | |
| $\frac{\text{Chloretone consumed}}{\text{Chloretone fed}} \times 100$ | 85 | 92 | 86 | 73 | 63 |

TABLE B

Hourly conversion of chloretone to methacrylic acid

[Regenerated tin phosphate catalyst @ 330° C.]

| Data | First Hour | Second Hour | Third Hour | Fourth Hour |
|---|---|---|---|---|
| Space Velocity (per min.) | 6 | 4 | 6 | 5 |
| Input (mols chloretone) | 0.045 | 0.027 | 0.045 | 0.040 |
| Output (in mols): | | | | |
| Hydrogen Chloride | 0.112 | 0.068 | 0.106 | 0.078 |
| Chloretone Recovered | 0.007 | 0.004 | 0.009 | 0.013 |
| Methacrylic acid | 0.041 | 0.026 | 0.040 | 0.036 |
| *Conversion* | | | | |
| $\frac{\text{Chloretone consumed}}{\text{Chloretone fed}} \times 100$ | 85 | 85 | 80 | 67 |

Table A shows the percent conversion of the chloretone fed as a function of time for the freshly prepared tin phosphate catalyst. In Table B similar data are shown for the catalyst regenerated by steaming the catalyst bed at 500° C. until all of the hydrogen chloride was removed, followed by burning with air at 500° C. until the exit stream was free of carbon dioxide. It will be observed that the regenerated catalyst has substantially the same activity as the fresh catalyst.

The principle of our invention embraces the use of catalysts, such as the acid phosphates of the heavy metals of subgroups 1, 2, 3, and 4, i. e., phosphates containing an excess of $P_2O_5$ over that theoretically required to combine with the metal oxide to form the orthophosphate, as well as the metal phosphates and phosphoric acid.

The catalysts may be supported on a variety of materials, such as kieselguhr, silica gel, alorco alumina, porous brick, or the like. Pumice and kieselguhr are the preferred supports.

By the term heavy metals of subgroups 1, 2, 3, and 4 as employed in the specification and claims, we mean those metals having an atomic weight equal to or higher than copper.

It will be appreciated that the process of our invention is highly adaptable for commercial use since it provides a simple one-step process whereby methacrylic acid may be produced continuously on a large scale. Further, the hydrogen chloride formed may be conveniently recovered for further synthesis.

Having now fully described our invention and the manner of operation thereof, what we claim as new and useful and wish to secure by Letters Patent is:

We claim:

1. A process for the production of methacrylic acid which comprises contacting a vaporous reactant mixture of chloretone and water with a compound selected from the class consisting of the phosphates and acid phosphates of the heavy metals of subgroups 1, 2, 3, and 4 of the periodic table of the elements and carrier supported phosphoric acid as the catalytic agent at a temperature of from about 200° C. to about 400° C. in a reaction zone to form methacrylic acid and hydrogen chloride and recovering the methacrylic acid so formed from the product mixture.

2. A process for the production of methacrylic acid which comprises contacting a vaporous reactant mixture of chloretone and water with a compound selected from the class consisting of the phosphates and acid phosphates of the heavy metals of subgroups 1, 2, 3, and 4 of the periodic table of the elements and carrier supported phosphoric acid as the catalytic agent at a temperature of from about 300° C. to about 350° C. in a reaction zone to form methacrylic acid and hydrogen chloride and recovering the methacrylic acid so formed from the product mixture.

3. A process for the production of methacrylic acid which comprises contacting a vaporous reactant mixture of chloretone and water with stannic phosphate catalyst at a temperature of from about 200° C. to about 400° C. in a reaction zone to form methacrylic acid and hydrogen chloride and recovering the methacrylic acid so formed from the product mixture.

4. A process for the production of methacrylic acid which comprises contacting a vaporous reactant mixture of chloretone and water with zinc phosphate catalyst at a temperature of from about 200° C. to about 400° C. in a reaction zone to form methacrylic acid and hydrogen chloride and recovering the methacrylic acid so formed from the product mixture.

5. A process for the production of methacrylic acid which comprises contacting a vaporous reactant mixture of chloretone and water with copper phosphate catalyst at a temperature of from about 200° C. to about 400° C. in a reaction zone to form methacrylic acid and hydrogen chloride and recovering the methacrylic acid so formed from the product mixture.

6. A process for the production of methacrylic acid which comprises contacting a vaporous reaction mixture consisting of chloretone and water in which mixture the mol ratio of water to chloretone is greater than 1 with a compound selected from the class consisting of the phosphates and acid phosphates of the heavy metals of subgroups 1, 2, 3, and 4 of the periodic table of the elements and carrier supported phosphoric acid as the catalytic agent at a temperature of from about 200° C. to about 400° C. in a reaction zone to form methacrylic acid and hydrogen chloride and recovering the methacrylic acid so formed from the product mixture.

7. A process for the production of methacrylic acid which comprises contacting a vaporous reaction mixture consisting of chloretone and water in which mixture the mol ratio of water to chloretone is greater than 1 with stannic phosphate supported on a suitable carrier as the catalyst at a temperature of from about 300° C. to about 350° C. in a reaction zone to form methacrylic acid and hydrogen chloride and recovering the methacrylic acid so formed.

8. A process for the production of methacrylic acid which comprises contacting a vaporous reaction mixture consisting of chloretone and water in which mixture the mol ratio of water to chloretone is greater than 1 with zinc phosphate supported on a suitable carrier as the catalyst at a temperature of from about 300° C. to about 350° C. in a reaction zone to form methacrylic acid and hydrogen chloride and recovering the methacrylic acid so formed.

9. A process for the production of methacrylic acid which comprises contacting a vaporous reaction mixture consisting of chloretone and water in which mixture the mol ratio of water to chloretone is greater than 1 with copper phosphate supported on a suitable carrier as the catalyst at a temperature of from about 300° C. to about 350° C. in a reaction zone to form methacrylic acid and hydrogen chloride and recovering the methacrylic acid so formed.

10. A process for the production of methacrylic acid which comprises contacting a vaporous reaction mixture consisting of chloretone and water in which mixture the ratio of water to chloretone is from 10 to 20 mols of water to 1 mol of chloretone with a compound selected from the class consisting of the phosphates and acid phosphates of the heavy metals of subgroups 1, 2, 3, and 4 of the periodic table of the elements and carrier supported phosphoric acid as the catalytic agent at a temperature of from about 200° C. to about 400° C. in a reaction zone to form methacrylic acid and hydrogen chloride and recovering the methacrylic acid so formed from the product mixture.

11. A process for the production of methacrylic acid which comprises contacting a vaporous reaction mixture consisting of chloretone and water in which mixture the ratio of water to chloretone is from about 10 to about 20 mols of water to 1 mol of chloretone with stannic phosphate supported on a suitable carrier as the catalyst at a temperature of from 300° C. to 350° C. in a reaction zone to form methacrylic acid and hydrogen chloride and recovering the methacrylic acid so formed.

12. A continuous process for the production of methacrylic acid which comprises passing a vaporous reaction mixture consisting of chloretone and water, which mixture contains a molar excess of water, over a suitably supported catalyst, selected from the class consisting of the phosphates and acid phosphates of the heavy metals of subgroups 1, 2, 3, and 4 of the periodic system of the elements and phosphoric acid, contained in a reaction zone which is maintained at a temperature within the range of from about 200° C. to about 400° C. to form methacrylic acid and hydrogen chloride, withdrawing the reaction products formed from said zone and recovering the desired methacrylic acid from said products.

13. A process for the production of methacrylic acid which comprises contacting a vaporous reactant mixture of chloretone and constant boiling aqueous hydrochloric acid with a compound selected from the class consisting of the phosphates and acid phosphates of the heavy metals of subgroups 1, 2, 3, and 4 of the periodic table of the elements and carrier supported phosphoric acid as the catalytic agent at a temperature of from about 200° C. to about 400° C. in a reaction zone to form methacrylic acid and hydrogen chloride and recovering the methacrylic acid so formed from the product mixture.

GEORGE A. HARRINGTON.
EVERETT GORIN.

REFERENCES CITED

The following references are of record in the file of this patent:

UNITED STATES PATENTS

| Number | Name | Date |
|---|---|---|
| 2,226,645 | Thomas et al. | Dec. 31, 1940 |